(12) United States Patent
Nigliazzo et al.

(10) Patent No.: US 7,712,483 B2
(45) Date of Patent: May 11, 2010

(54) ADJUSTABLE SEAT VALVE WITH DEBRIS TRAP

(75) Inventors: Luke A. Nigliazzo, West Plains, MO (US); Dennis W. Pierog, Hoffman Estates, IL (US)

(73) Assignee: Robertshaw Controls Company, Carol Stream, IL (US)

( * ) Notice: Subject to any disclaimer, the term of this patent is extended or adjusted under 35 U.S.C. 154(b) by 414 days.

(21) Appl. No.: 11/338,347

(22) Filed: Jan. 24, 2006

(65) Prior Publication Data

US 2007/0169817 A1 Jul. 26, 2007

(51) Int. Cl.
*E03B 7/07* (2006.01)
(52) U.S. Cl. .......................... 137/546; 251/11
(58) Field of Classification Search ................. 137/546; 251/11, 129.01; 55/319, 392, 394, 397
See application file for complete search history.

(56) References Cited

U.S. PATENT DOCUMENTS

| | | | | |
|---|---|---|---|---|
| 2,001,610 A | * | 5/1935 | Hildenbrand | 210/303 |
| 3,513,880 A | * | 5/1970 | White | 137/630.22 |
| 3,708,965 A | * | 1/1973 | Domnick | 55/488 |
| 4,184,966 A | * | 1/1980 | Pall | 210/493.2 |
| 4,303,422 A | * | 12/1981 | Persinger | 96/135 |
| 4,412,650 A | * | 11/1983 | Young et al. | 236/48 |
| 4,681,296 A | * | 7/1987 | Shopsky | 251/11 |
| 5,037,061 A | * | 8/1991 | Shopsky | 251/11 |
| 5,318,268 A | * | 6/1994 | Cox et al. | 251/11 |
| 5,353,828 A | * | 10/1994 | Troscinski | 137/15.21 |
| 6,386,506 B1 | * | 5/2002 | Cox | 251/11 |
| 6,464,761 B1 | * | 10/2002 | Bugli | 96/135 |
| 2004/0187455 A1 | * | 9/2004 | Niakan et al. | 55/486 |
| 2004/0238440 A1 | * | 12/2004 | Clendenning et al. | 210/493.4 |

* cited by examiner

*Primary Examiner*—Stephen Hepperle
*Assistant Examiner*—Craig M Schneider
(74) *Attorney, Agent, or Firm*—Reinhart Boerner Van Deuren P.C.

(57) ABSTRACT

A debris trap for use in a gas valve fitting is provided. The debris trap comprises an elongated body extending about a first axis. The elongated body forms a passage therein extending along the first axis between an inlet formed in a first end of the elongated body and at least one outlet formed in the elongated body. The at least one outlet is formed in a side wall of the elongated body to provide fluid communication with the passage about a second axis perpendicular to the first axis.

2 Claims, 8 Drawing Sheets

ADJUSTABLE SEAT VALVE WITH DEBRIS TRAP

FIELD OF THE INVENTION

This invention generally relates to adjustable seat gas valves for use in appliances, and more particularly, to adjustable seat poppet gas valves for use in appliances.

BACKGROUND OF THE INVENTION

Many household appliances, particularly ranges, water heaters and dryers, burn natural gas or liquid petroleum ("LP") (natural gas and LP will be hereinafter referred to generally as "gas") to create heat energy. The appliances require a flow regulating valve to control the gas flow from a gas supply to a burner. One such flow regulating valve is a poppet valve.

A poppet valve has a seat that includes a gas passage and a sealing device such as a rubber poppet connected to an actuating arm. The poppet valve functions by selectively moving the rubber poppet toward or away from the seat by selectively actuating the arm connected to the rubber poppet. Particularly, the rubber poppet is moved away from the seat to increase the size of the flow passage or "open" the valve to increase the gas flow rate. The rubber poppet is moved toward the seat to decrease the size of the flow passage or to "close" the valve to decrease or terminate the gas flow rate. The amount of travel by the arm away from the seat determines the distance between the rubber poppet and the seat and the size of the flow passage that is created. To completely stop the gas flow, the rubber poppet is pressed against the seat to completely seal the gas flow passage.

Typically, the arm must be actuated to open the valve. To provide for fail safe operation, the arm is typically spring loaded such that it will automatically close when the arm is not being actuated. This configuration is preferred because if the action mechanism fails it is preferred to have the valve fail in the "closed" position.

The seat is typically a metallic material and the rubber poppet is typically a resilient material such as rubber, plastic or nylon that allows for good sealing contact with the metal seat.

The seat is typically threaded into a metal fitting that is attached to the body of the valve. By being threaded into the fitting, the valve may be adjusted by screwing the seat towards or away from the sealing disc of the poppet. This adjustable configuration is typically referred to as an adjustable seat valve. The metal fitting further includes threads for attaching the gas valve to a gas line having a corresponding fitting.

One problem with the current design of the adjustable seat valve is that when a metal fitting of the gas line is threaded to the metal fitting of the gas valve, the sliding contact between the two fittings forms tiny metal particulates and shavings. Further, when the seat is adjusted, the interaction between the seat and the tool used to adjust the seat may create metal particulates and shavings as well.

To prevent such particulates and shavings from falling into the valve, a wire mesh screen is typically employed above the sealing surface of the valve. Unfortunately, while such a screen is effective to block particles greater than 0.010", particulates and shavings smaller than this are able to fall through the screen and the gas flow passage of the seat and land on the rubber poppet. Over time, this debris may prematurely deteriorate the sealing disc of the poppet thereby decreasing the seal that can be formed between the rubber poppet and the seat. Particulates from 0.001" to 0.010" are identified to cause such leaks. Unfortunately, providing increased filtering of such particulates would unacceptably reduce the BTU flow rate and pressure drop through the valve.

Therefore, a device that would prevent the metal particulate or shavings from falling through the gas flow passage and onto the rubber poppet to prevent deterioration of the seal without unacceptably reducing the BTU flow rate and the pressure drop through the valve would be desirable. The invention provides such a device.

BRIEF SUMMARY OF THE INVENTION

In one aspect, the invention provides a debris trap for use in gas valve fittings. The debris trap comprises an elongated body extending about a first axis. The elongated body forming a passage therein extending along the first axis between an inlet formed in a first end of the elongated body and at least one outlet formed in the elongated body. The at least one outlet is formed in a side wall of the elongated body to provide fluid communication with the passage about a second axis perpendicular to the first axis.

In another aspect, the invention provides a debris trap for a gas valve. The debris trap comprises a fitting body defining a first passage therethrough having an inlet adapted to couple to the gas valve and an outlet adapted to mate with an external gas fitting. The debris trap further comprising an adjustable seat positioned at least partially within the fitting body at the inlet and an elongated body positioned at least partially within the fitting body at the outlet. The elongated body forms a second passage therein between a first end of the elongated body and at least one gas outlet formed in a side wall of the elongated body. The elongated body has a closed end distally positioned from the first end. The outer diameter of the elongated body and an inner diameter of the outlet of the fitting body form a debris trapping channel therebetween.

In yet another aspect, the invention provides a debris trap for use in gas valve fittings. The debris trap comprises an elongated body extending about a first axis. The elongated body forming a passage therein extending along the first axis between an inlet formed in a first end of the elongated body. A cap is formed at a second end of the elongated body. The elongated body further forms at least one outlet in a side wall of the elongated body to provide fluid communication with the passage.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
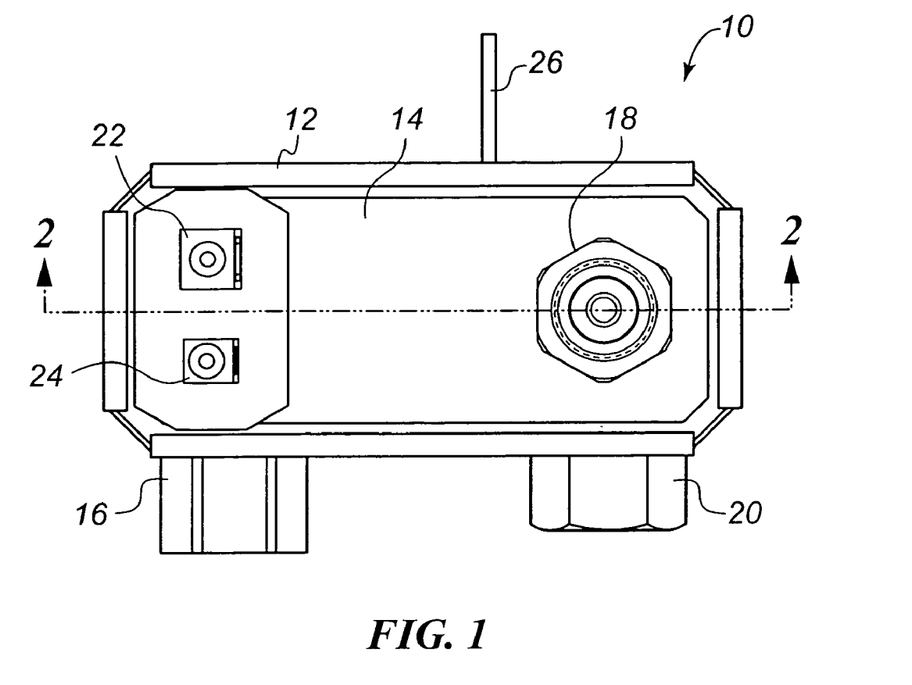
FIG. 1 is a top view of an exemplary embodiment of a gas valve constructed in accordance with the teachings of the present invention.

Referring to FIG. 1, a gas valve 10 according to one embodiment of the present invention is disclosed. The gas valve 10 generally includes a valve body 12, a lid or cover 14, an inlet fitting 16, an outlet fitting 18, a secondary bypass outlet fitting 20, a pair of electric terminals 22, 24 and a mounting bracket 26. The inlet fitting 16 is the gas inlet from the gas supply line for the gas valve 10 and the outlet fittings 18, 20 are the gas outlets that may be connected to the appliance's burners, etc. for the gas valve 10.

Figure 2:
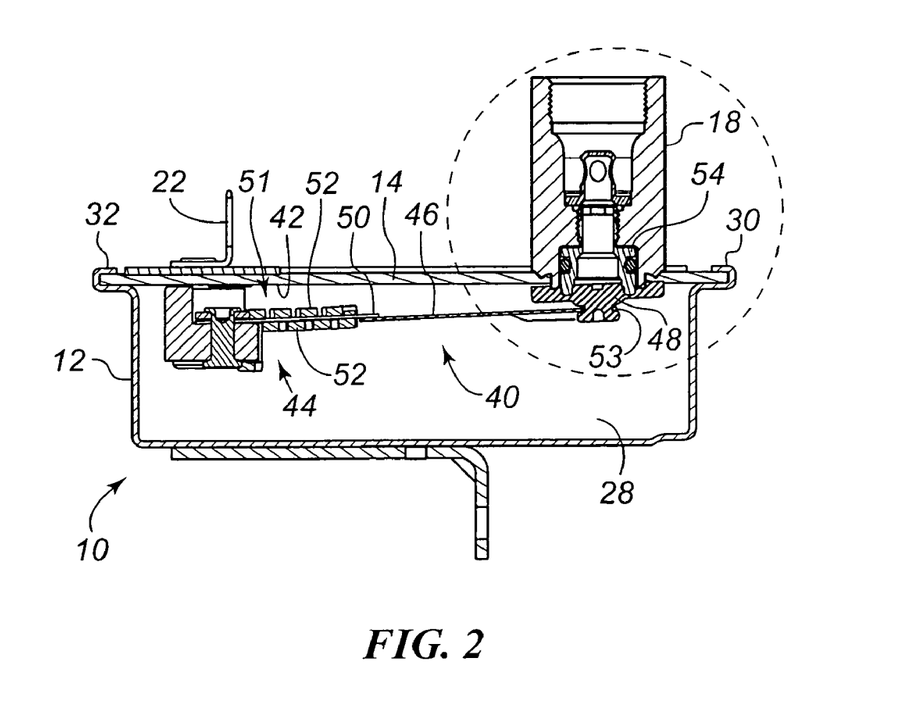
FIG. 2 is a cross-sectional illustration of the gas valve of FIG. 1 about line 2-2 better illustrating the gas valve outlet fitting constructed in accordance with the teachings of the present invention.

As shown in FIG. 2, the gas valve 10 defines a chamber 28 defined between the valve body 12 and the lid 14. The lid 14 is sealingly attached to the valve body 12, e.g., by rolled edges 30, 32 of the valve body 12. A poppet valve assembly 40 is secured to the interior side 42 of the lid 14. The poppet valve assembly 40 generally includes actuating means 44, an extension arm 46, and a poppet 48. The actuating means 44 actuates the extension arm 46 to selectively move the poppet 48 upward (towards the lid 14) or downward (away from the lid 14) in the orientation illustrated in FIG. 2.

Figure 4:
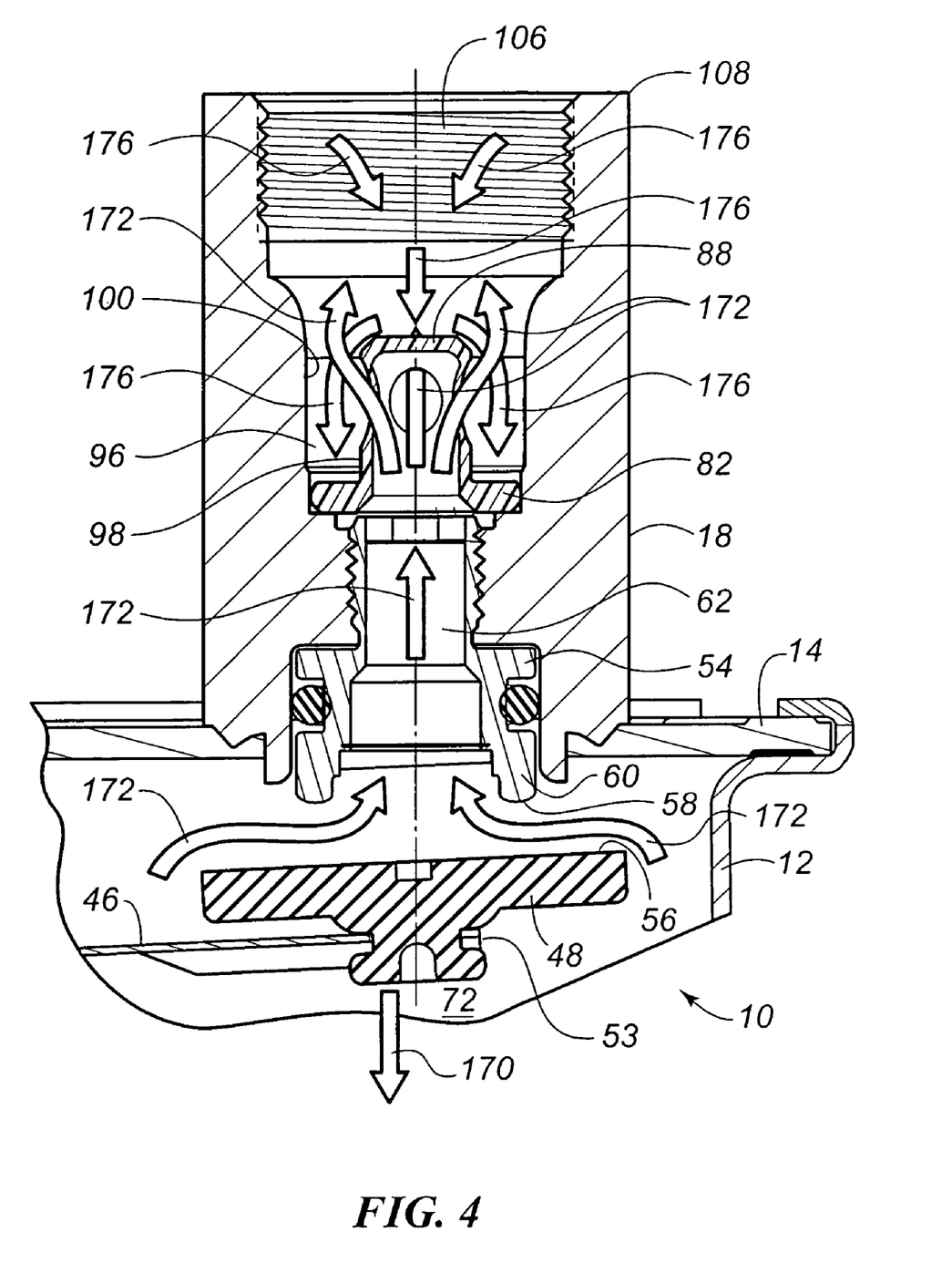
FIG. 4 is an enlarged partial illustration of the outlet fitting in FIG. 2 in an open position.

In this embodiment, the actuating means 44 includes a bimetallic strip 50. Particularly, a portion of the extension arm 46 at a first end 51 includes the bimetallic strip 50 which is surrounded by a heating coil 52. The heating coil 52, which is connected to terminals 22, 24 (FIG. 1), is used to selectively heat the bimetallic strip 50 to cause the bimetallic strip 50 to bend and thereby selectively actuate the poppet 48 to move it in a downward direction, as oriented in FIG. 2, and open the valve 10, as shown in FIG. 4. When the bimetallic strip 50 cools, the bimetallic strip 50 straightens and actuates the poppet 48 in an upward direction to close the valve 10.

Figure 3:
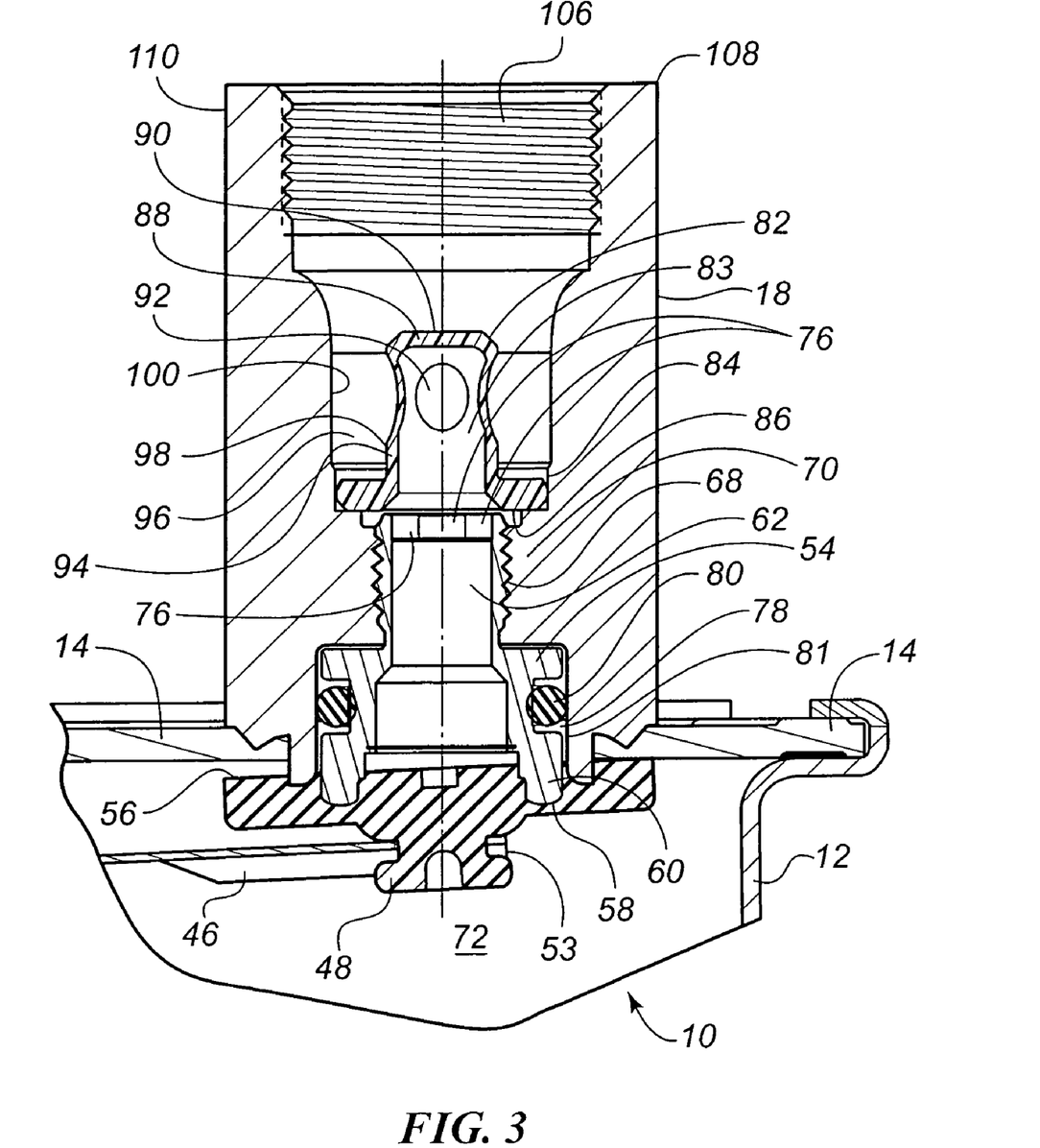
FIG. 3 is an enlarged partial illustration of the outlet fitting in FIG. 2 in a closed position.

As best shown in FIG. 3 (with the poppet 48 in the closed position) and FIG. 4 (with the poppet 48 in the open position), the poppet 48 is attached to a second end 53 of the extension arm 46 and interacts with an adjustable seat 54 connected to and partially located in the outlet fitting 18. The poppet 48 is generally made from any rubber, plastic, nylon or other material that is impervious to gas and forms good sealing contact with metal or plastic. The adjustable seat 54 is generally made from any plastic or metal that is impervious to and immune to gas. The interaction between the adjustable seat 54 and the poppet 48 controls the flow of gas through the gas valve 10.

Particularly, a top surface 56 of the poppet 48 interacts with a bottom surface 58 of an annular shoulder portion 60 of the adjustable seat 54. The top surface 56 of the poppet 48 is pressed vertically upward against the bottom surface 58 of the annular shoulder portion 60 to create a seal and prevent gas from flowing through passage 62 in the adjustable seat 54. As is illustrated in FIG. 3, the rubber poppet 48 deforms to some extent as it is pressed against the adjustable seat 54. In this condition, the valve 10 is in a "closed" position. To move the valve to an "open" position, the rubber poppet 48 is moved vertically downward (in the orientation of FIGS. 3 and 4) and away from the adjustable seat 54, as illustrated by arrow 170 in FIG. 4. This condition allows gas to flow through the passage 62 of the adjustable seat 54 and the outlet fitting 18, as illustrated by arrows 172.

Referring again to FIG. 3, the adjustable seat 54 includes threads 68 that cooperate with threads 70 of the outlet fitting 18 to threadedly and adjustably connect the adjustable seat 54 to and at least partially within the outlet fitting 18. The adjustable seat 54 and outlet fitting 18 are positioned coaxial along central axis 72. The adjustable seat 54 may be selectively adjusted by axially positioning the adjustable seat 54 within the outlet fitting 18, thereby calibrating the gas valve 10, as will be more fully explained below. The adjustable seat 54 further includes an annular groove 78 that carries an o-ring 80 which interacts with an inner surface 81 of the outlet fitting 18 to seal the adjustable seat 54 within the outlet fitting 18.

The adjustable seat 54 requires structure for a tool (not shown) to thread the adjustable seat 54 within the outlet fitting 18. In an embodiment of the present invention, the interior surfaces 76 of a top portion of the passage 62 define a hexagonally shaped passage. Thus, a tool having a hexagonal shape can be inserted into the hexagonally shaped passage to engage the adjustable seat 54 to enable calibration thereof.

Referring to FIG. 4, if the gas valve 10 is allowing too much gas to flow through the gas valve 10 when the valve 10 is opened, the gap between the adjustable seat 54 and the top surface 56 of the rubber poppet 48 is too large. Thus, the gas valve must be calibrated by threading the adjustable seat 54 axially/vertically downward towards the top surface 56 of the rubber poppet 48 to reduce the gap between the top surface 56 of the rubber poppet 48 and the adjustable seat 54. This will restrict the flow of gas through the gas valve 10 to a desired setting. Likewise, if an insufficient amount of gas is flowing through the gas valve 10 when in the open position, the valve can be calibrated in the opposite manner by selectively threading the adjustable seat 54 axially/vertically upward and away from the top surface 56 of the rubber poppet 48 to increase the gap therebetween.

In an embodiment of the present invention as illustrated in FIGS. 3 and 4, a debris trap 82 is located within the outlet fitting 18. The debris trap 82 is preferably positioned vertically above the adjustable seat 54 as well as coaxial with the adjustable seat 54 and outlet fitting 18. In an embodiment, the debris trap 82 is generally cylindrical in shape and defines a passage 83 therein. However, it is contemplated that the debris trap 82 could take any shape such that it may be secured within the outlet fitting 18 and it does not require a round cross-section. Furthermore, the debris trap may be manufactured from any plastic, nylon, rubber, metal or other material that is appropriate in a gas environment.

The debris trap 82 includes an annular flange 84 at a bottom end 86 and a cap 88 at a second end 90. The cap 88 prevents contaminates from falling vertically downward through the passage 62 of the adjustable seat 54. To allow gas to flow through the debris trap 82, because the second end 90 of the debris trap 82 and the passage 83 it defines is closed by the cap 88 to axial flow of gas, a plurality of apertures 92 located generally at the second end 90 extend horizontally through a sidewall 94 of the debris trap 82. In an embodiment, these apertures are oval in shape. However, it is contemplated that these apertures could take any shape that that allows gas to flow therethrough (see FIGS. 5 and 7). Furthermore, the apertures 92 are axially spaced above the annular flange 84 a sufficient distance to define an annular debris catching channel 96 between an outer surface 98 of the sidewall 94 and an inner surface 100 of the outlet fitting 18 and above the annular flange 84.

The annular flange 84 at the bottom end 86 of the debris trap 82 secures the debris trap 82 within the outlet fitting 18. In one embodiment, the outer diameter of the annular flange 84 is approximately equal to or slightly larger than the inner diameter of the outlet fitting 18 wherein the debris trap 82 is positioned. In this embodiment, the debris trap 82 is secured within the outlet fitting 18 by a friction fit whereby the interior of the outlet fitting 18 resiliently compresses the flange 84. Alternatively, the outer surface of the debris trap 82 could be threadedly connected to the outlet fitting 18. In a further alternative embodiment, the debris trap 82 could be secured within the main outlet fitting 18 using a sealant or adhesive.

A further embodiment of the present invention does not require a flange on the debris trap. In this embodiment, the debris catching channel 96 would still be formed between an outer surface 98 of the sidewall 94 and an inner surface 100 of the outlet fitting 18, but the bottom of the debris catching channel would be a radially inward projecting shoulder defined by the outlet fitting 18. The embodiment that does not include a flange may be mounted within the outlet fitting by any of the means explained previously such as, but without limitation, by adhesive, threading, friction fit and the like.

In the illustrated embodiment of FIG. 3, the main outlet fitting 18 includes an internally threaded portion 106 at a top end 108 defining a female portion of a coupling (not shown). A male threaded portion of an orifice, a threaded tube or a locking collar for a double folded tube can be threaded into the threaded portion 106 to connect the gas valve 10 to a burner or orifice (not shown). The main outlet fitting 18 typically has an outer periphery 110 (see also FIG. 1) that is hexagonal in shape. This allows a wrench to be secured to the outlet fitting 18 when tightening the tubing, orifice, or the like to the outlet fitting 18. One of skill in the art will appreciate that the outer periphery 110 is also not limited in shape.

Figure 5:
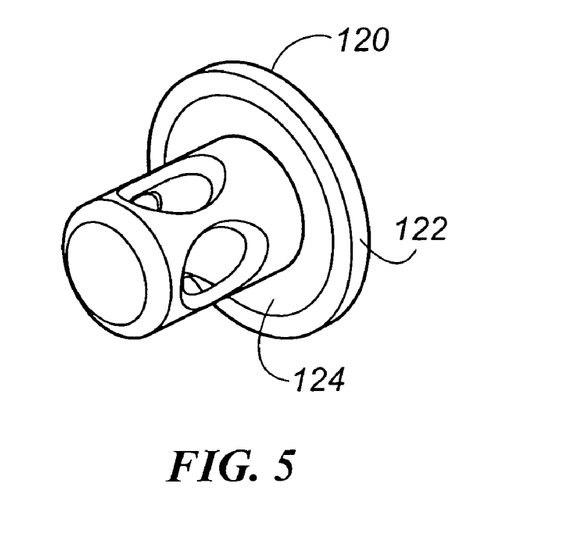
FIG. 5 is a perspective illustration of a further embodiment of a debris trap in accordance with the present invention having an annular channel in a radially extending flange.
Figure 6:
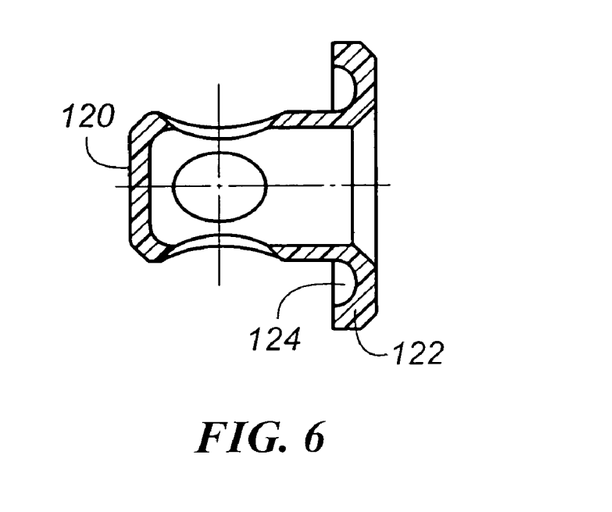
FIG. 6 is a cross-sectional illustration of the debris trap of FIG. 5.

Alternative embodiments of debris traps according to the present invention are illustrated in FIGS. 5-8. The debris trap 120 illustrated in FIGS. 5 and 6 is similar to the previously disclosed embodiment. However, the annular flange 122 in this embodiment includes an annular groove 124 defined in the annular flange 122. This groove 124 further facilitates trapping debris as will be discussed more fully below.

Figure 7:
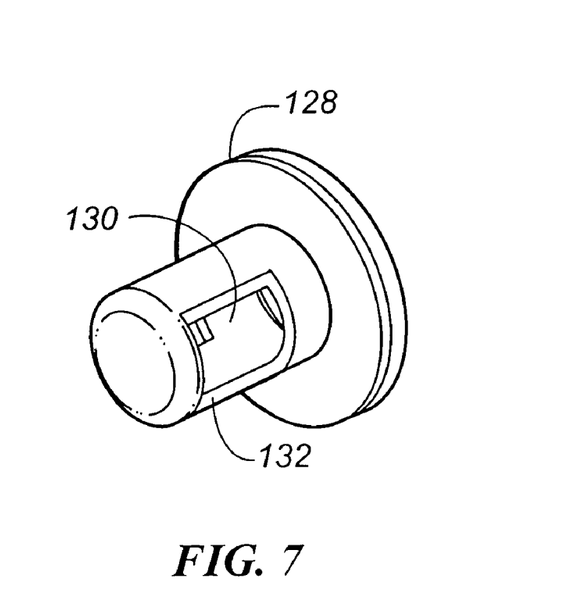
FIG. 7 is a perspective illustration of a further embodiment of a debris trap in accordance with the present invention having rectangular shaped apertures.
Figure 8:
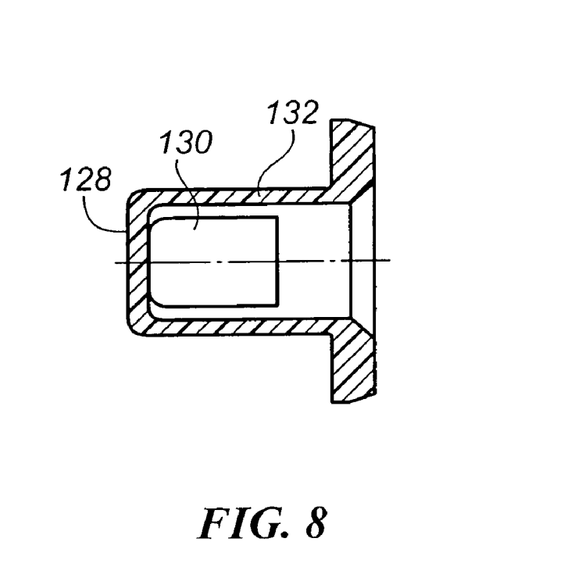
FIG. 8 is a cross-sectional illustration of the debris trap of FIG. 7.

In another embodiment of the debris trap 128, illustrated in FIGS. 7 and 8, the debris trap 128 is also similar to the previously disclosed embodiments. However, this debris trap 128 includes rectangular shaped apertures 130 defined in the cylindrical side wall 132 of the debris trap 128.

Figure 9:
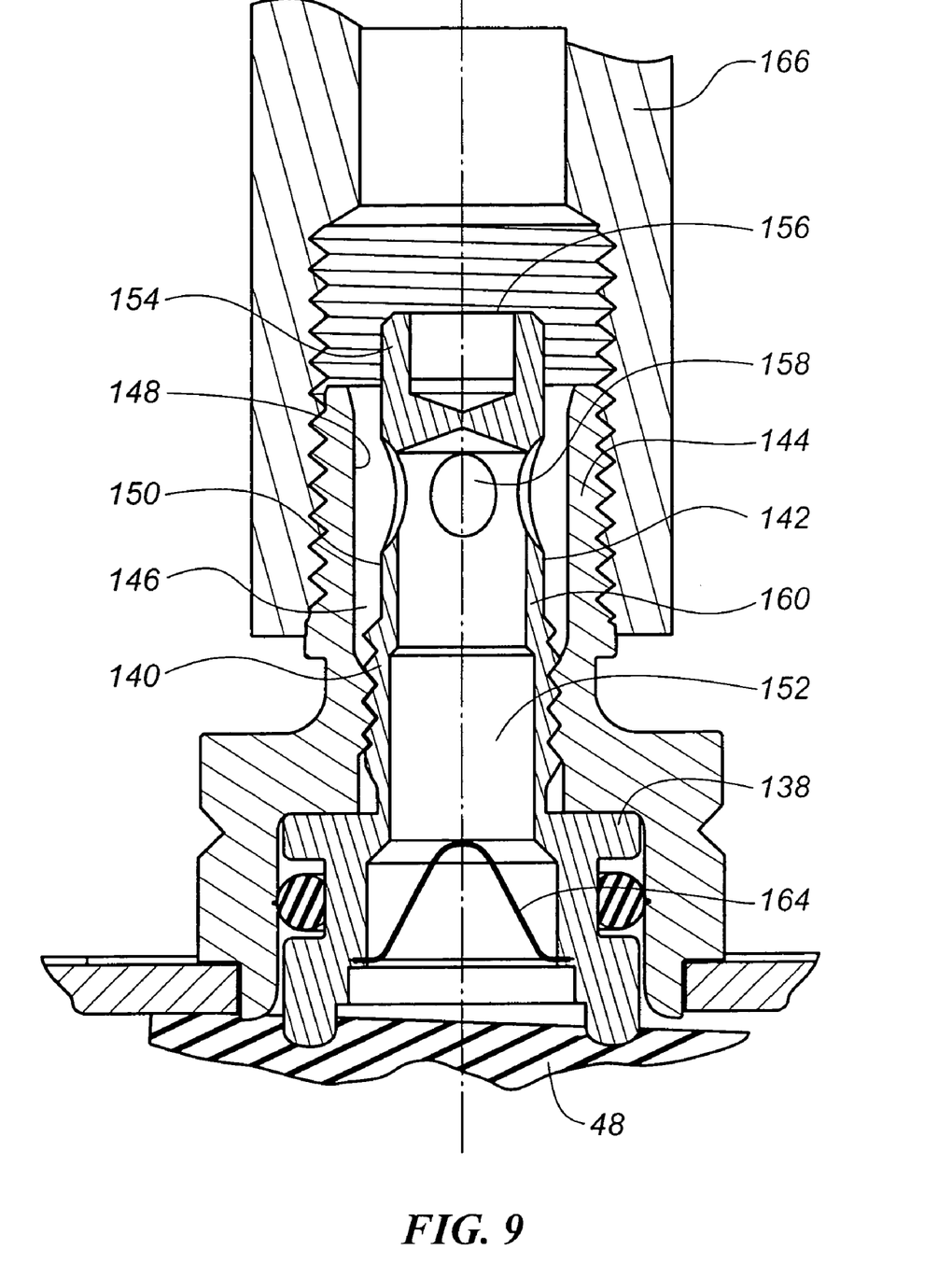
FIG. 9 is a cross-sectional illustration of a further embodiment of an adjustable seat constructed in accordance with the present invention wherein the debris trap is integrally formed with the adjustable seat.
Figure 10:
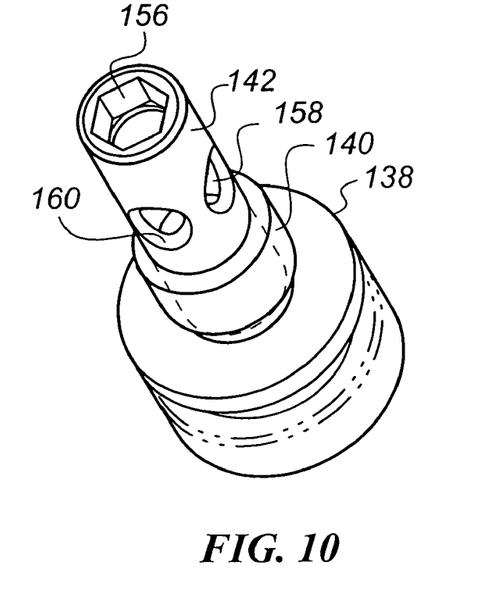
FIG. 10 is a perspective illustration of the adjustable seat of the FIG. 9.

A further embodiment of an adjustable seat 138 constructed in accordance with the teachings of the present invention is illustrated in FIGS. 9 and 10. In this embodiment the adjustable seat 138 incorporates the debris trap 82 and adjustable seat 54 of the previous embodiments into a unitary body. As best illustrated in FIG. 9, the adjustable seat 138 does not terminate axially at threads 140. Instead, the adjustable seat includes an upper portion 142 that extends axially beyond and vertically above the threads 140 that connect the adjustable seat 138 to the main outlet fitting 144. In this embodiment, the upper portion 142 and the adjustable seat 138 are cylindrical. However, it will be appreciated by one of skill in the art that the adjustable seat 138 and upper portion 142 may take other shapes and profiles. Particularly, the adjustable seat and upper portion will be configured to be inserted into the outlet fitting 144.

As illustrated, the upper portion 142 has a smaller outside diameter than the inside diameter of an axially corresponding portion of the main outlet fitting 144. In this embodiment, rather than having a separate debris trap component to define a debris trapping channel, an annular debris trapping channel 146 is defined between an inner surface 148 of the main outlet fitting 144 and an outer surface 150 of the upper portion 142. It will be appreciated from the foregoing that in an embodiment the debris trap and outlet fitting may be formed from an unitary body.

Figure 11:
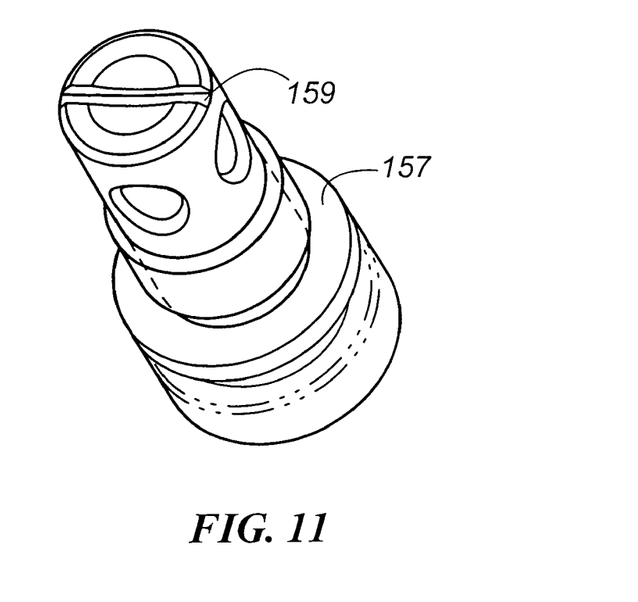
FIG. 11 is a perspective illustration of a further embodiment of an adjustable seat constructed in accordance with the present invention wherein the debris trap is integrally formed with the adjustable seat.
Figure 12:
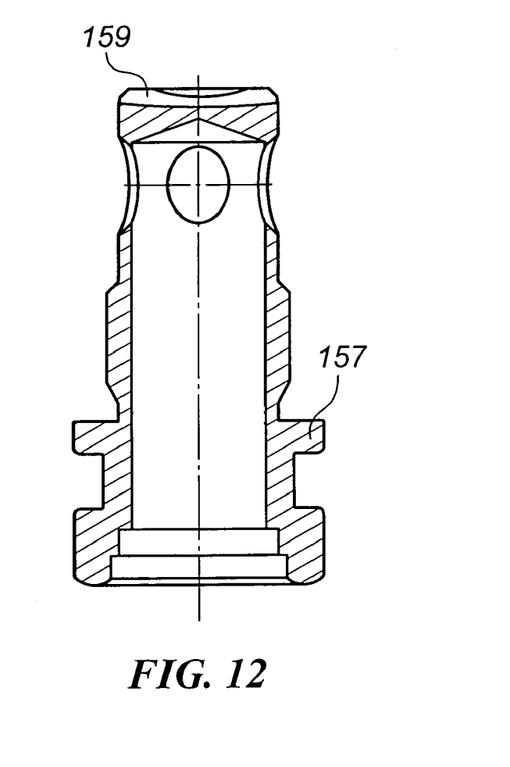
FIG. 12 is a cross-sectional illustration of the adjustable seat of FIG. 11.

Like the debris trap in the previous embodiments, the adjustable seat 138 of the present embodiment includes a passage 152 through which the gas flows. Further, the passage 152 is capped at the end by a cap 154 that prevents gas from exiting the adjustable seat 138 in an axial direction. However, in this embodiment the cap 154 includes the means for a tool (not shown) to engage the adjustable seat 138 to calibrate the adjustable seat 138 as explained previously. In the embodiment of FIGS. 9 and 10, the cap 154 includes a cavity 156 having a hexagonal interior shape such that a hexagonally shaped tool, such as an allen wrench or the like, may engage the adjustable seat 138 for calibration. It is contemplated that the means for engaging the tool could be any shape. A further embodiment of an adjustable seat 157, shown in FIGS. 11 and 12, includes a slot 159 for receipt of a flat bladed screwdriver or the like. However, as just stated, this slot could be of different configurations, e.g., crossed to accommodate a Phillips head screwdriver, etc.

Returning to FIG. 9, the passage 152 includes a cap 154 on the end of the cylindrical portion 142 that prevents gas from exiting the adjustable seat 138 in an axial direction, a plurality of apertures 158 extend through the side wall 160 of the cylindrical portion 142 to allow gas to exit the adjustable seat 138 by flowing radially outward through the sidewall 160. Again, it is contemplated that the apertures 158 may be any shape sufficient to allow gas to flow therethrough.

The adjustable seat 138 of the present invention may also include a screen 164 adapted to prevent larger particles and contaminate from falling through the adjustable seat 138 and onto the poppet 48. It is preferable that the screen 164 is substantially conical in shape such that the particulate it traps falls to the edges of the screen 164 to minimize or reduce the blockage thereof.

In an embodiment, as illustrated in FIG. 9, the outlet fitting 144 is a male fitting such that it is externally threaded rather than internally threaded as in the previous embodiments. The fitting 144 threadedly couples with a female fitting 166.

Figure 13:
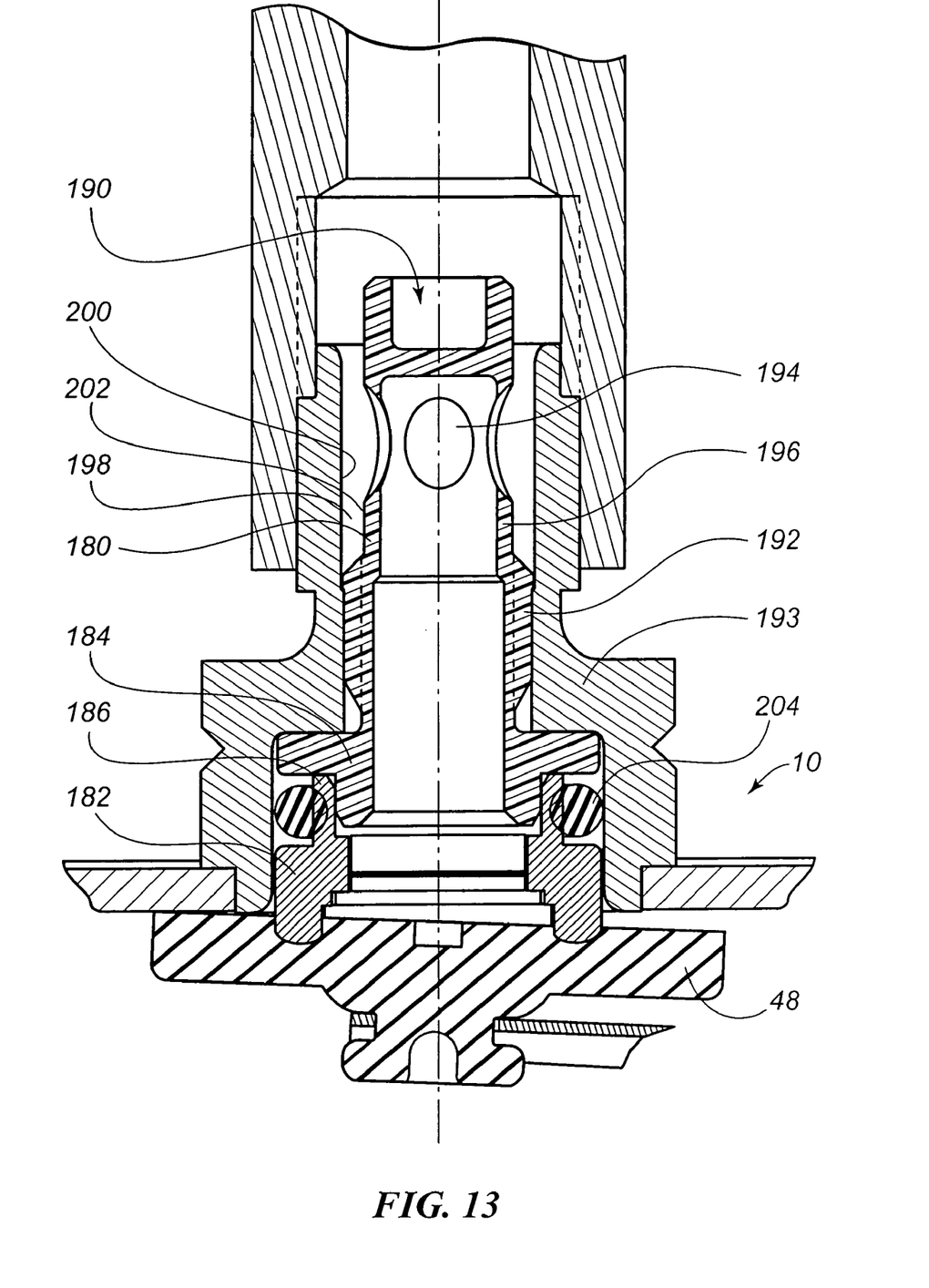
FIG. 13 is a cross-sectional illustration of a further embodiment of a seat and a debris trap constructed in accordance with the present invention wherein the debris trap is press-fit connected to the seat.
Figure 14:
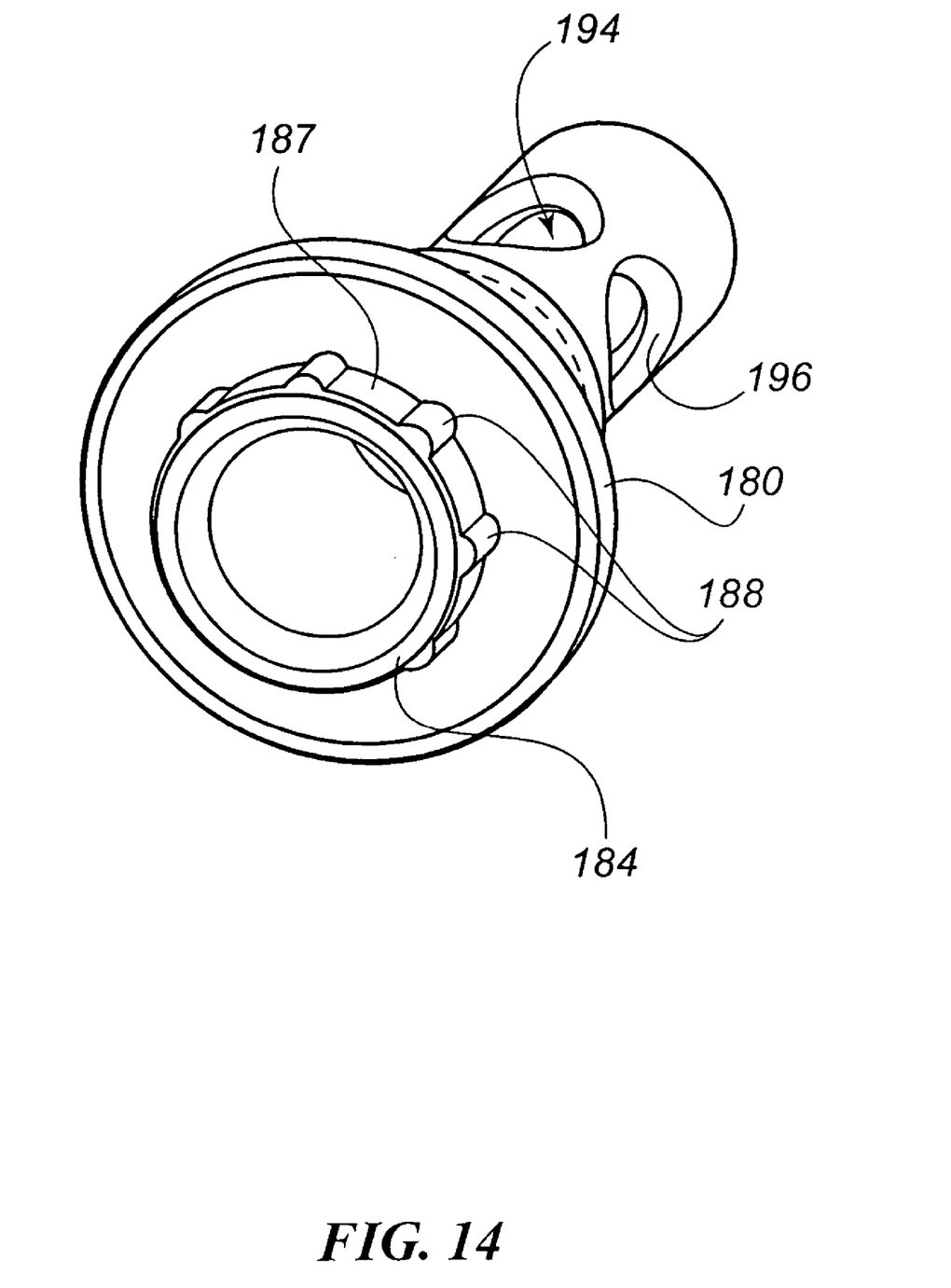
FIG. 14 is a perspective illustration of the debris trap in FIG. 13 illustrating the ribs for improving the press fit connection between the debris trap and seat.

FIG. 13 illustrates another embodiment of an adjustable seat and debris trap in accordance with the present invention. In this embodiment, the debris trap 180 and seat 182 are separate components. In one embodiment, the debris trap 180 is press fit secured to the seat 182. Specifically, a male coupling portion 184 of the debris trap 180 is press-fit into a corresponding female coupling portion 186 of the seat 182. To increase the press-fit connection between the debris trap 180 and the seat 182, the outer surface 187 of an embodiment of the male coupling portion 184 of the debris trap 180 includes a plurality of ribs 188 (see FIG. 14). These ribs 188 deflect and/or compress when the male coupling portion 184 is pressed into the female coupling portion 186 to increase the connection therebetween. Furthermore, these ribs 188 may be positioned on the inside of the female coupling portion 186. To assist insertion, the male and female coupling portions 184 and 186 may be chamfered. It will be appreciated that the debris trap 180 may be secured to the seat 182 in numerous ways including snap fit, threading and the like. The invention is not, therefore, limited to only a press fit connection between the debris trap 180 and the seat 182.

Returning to FIG. 13, at an end opposite the male coupling portion 184, the debris trap 180 includes a cavity 190 for an adjustment tool (not shown) to engage while adjusting the gas valve 10. The cavity 190 may take any shape sufficient for engagement by the tool, as explained and illustrated previously. The debris trap 180 includes an externally threaded portion 192 for threadedly securing the debris trap 180 within the main outlet fitting 193. The threaded portion 192 further functions to allow for adjustment and calibration of the gas valve 10, as explained previously. A plurality of apertures 194 extend through a side wall 196 of the debris trap 180 and allow gas to pass through the debris trap 180.

Similar to the embodiment illustrated in FIGS. 9-12, an annular debris trapping channel 198 is defined between an inner surface 200 of the main outlet fitting 193 and an outer surface 202 of the debris trap 180. This annular debris trapping channel 198 is axially positioned between the plurality of apertures 194 and the threaded portion 192.

The seat 182 of this embodiment functions similarly to the adjustable seat 54 in the embodiments illustrated in FIGS. 2-4 and explained previously. However, to threadedly adjust and calibrate the gas valve 10 by adjusting the seat 182 relative to the rubber poppet 48, the debris trap 180, to which the seat 182 is secured, must be threadedly adjusted relative to the main outlet fitting 193. An o-ring 204 creates a seal between the seat 182 and the main outlet fitting 193.

This embodiment is beneficial because the structurally more complex and more difficult component to manufacture, the debris trap 180, may be manufactured from a more moldable material such as nylon or plastic. Furthermore, the structurally less complex component that none-the-less requires high, if not higher, tolerances, the seat 182, may be manufactured from another material, such as a metal, e.g. aluminum.

In operation, the gas valve 10 (FIGS. 1 and 2) regulates and controls the volume and flow of gas supplied to an appliance. Particularly, the gas valve 10 uses a poppet valve assembly 40 having a poppet 48 that cooperates with an adjustable seat 54 to control the flow of gas through the gas valve 10. The extension arm 46 of the poppet valve 40 is actuated by passing electrical current through the heating coils 52 surrounding a bimetallic strip 50 which incorporates two metals that expand at different rates when heated that is attached to the extension arm 46. As the bimetallic strip 50 increases in temperature, the two different types of metal in the bimetallic strip 50 expand at different rates thereby causing it to bend. In this embodiment, as the bimetallic strip 50 is heated, the bimetallic strip 50 bends such that the second end 53 of the extension arm 46 and the poppet 48 attached to the second end 53 are moved in a downward direction indicated by arrow 170, see FIG. 4, and away from the annular shoulder portion 60 of the adjustable seat 54 to open the valve 10 and allow the flow of gas therethrough.

As the rubber poppet 48 goes from a seated or closed position (see FIG. 3) wherein the poppet 48 and particularly the top surface 56 of the rubber poppet 48 is in full sealing contact with the bottom surface 58 of the annular shoulder portion 60 of the adjustable seat 54 to an unseated or open position (see FIG. 4) wherein the rubber poppet 48 does not contact the adjustable seat 54, gas previously trapped within the body 12 of the gas valve is permitted to flow through the adjustable seat 54, particularly the passage 62 of the adjustable seat 54, and out of the outlet fitting 18. This flow of gas from within the gas valve 10 through the adjustable seat 54 and the outlet fitting 18 is illustrated by arrows 172.

When a hose, tube, locking collar, or the like is threadedly attached and secured to the main outlet fitting 18 via the threaded portion 106 at the top of the outlet fitting 18, contaminates such as small metal particulate, shavings, filings and the like are formed as discussed above. These contaminates fall vertically downward and into the outlet fitting 18. Previously, these contaminates would fall all the way through the fitting and land on the poppet 48. However, in the present invention, the contaminates fall (indicated by arrows 176 into the outlet fitting 18 and are trapped by the debris trap 82. Particularly, the contaminates fall and hit the cap 88 of the debris trap 82. These contaminates are either stopped on the cap 88 or fall into the annular debris trapping channel 96 defined between a portion of an inner surface 100 of the outlet fitting 18 and a portion of the outer surface 98 of the debris trap 82. Thus, by adding the debris trap 82 to the valve, the contaminates are prevented from falling axially through the adjustable seat 54 and do not fall onto the poppet 48.

It will be appreciated, that in alternative embodiments of the adjustable seat, namely the embodiments corresponding to FIGS. 9-12, contaminates created by the interaction of the adjustable seats 138, 157 and a tool during calibration of the adjustable seats 138, 157 are similarly prevented from falling onto the rubber poppet 48.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A debris trap for a gas valve, the debris trap comprising:
    a fitting body defining a first passage therethrough having a first inlet adapted to couple to the gas valve and a first outlet adapted to mate with an external gas fitting;
    a seat positioned at least partially within the fitting body at the first inlet;
    an elongated body positioned at least partially within the fitting body at the first outlet, the elongated body extending about a first axis, the elongated body forming a second passage therein extending along the first axis between a second inlet formed in a first end of the elongated body and at least one second outlet formed in the elongated body, the at least one second outlet formed in a side wall of the elongated body to provide fluid communication with the second passage about a second axis perpendicular to the first axis communicating the first passage with the second passage, the elongated body having a closed end distally positioned from the first end, the elongated body being a one-piece unitary body;
    further comprising a flange extending radially outward from an outer periphery of the elongated body, the flange being unitarily formed with the elongated body into a single piece;
    wherein an outer diameter of the elongated body and an inner diameter of the first outlet of the fitting body form a debris trapping channel therebetween;
    wherein the flange is located in proximity to the first end of the elongated body and axially displaced from the at least one second outlet; and
    wherein the flange includes an annular groove defined therein to facilitate trapping debris therein.

2. The debris trap of claim 1, wherein the at least one second outlet is axially displaced from the first end along the first axis.

* * * * *